United States Patent
Kawano et al.

(10) Patent No.: US 9,753,739 B2
(45) Date of Patent: Sep. 5, 2017

(54) OPERATING SYSTEM MANAGEMENT OF SECOND OPERATING SYSTEM

(71) Applicant: LENOVO (Singapore) PTE, LTD., New Tech Park (SG)

(72) Inventors: Seiichi Kawano, Sagamihara (JP); Jedd Benedict Kris Mahilum, Fujisawa (JP); Kenji Oka, Yokohama (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 166 days.

(21) Appl. No.: 14/257,815

(22) Filed: Apr. 21, 2014

(65) Prior Publication Data

US 2014/0317392 A1 Oct. 23, 2014

(30) Foreign Application Priority Data

Apr. 22, 2013 (JP) .................. 2013-089422

(51) Int. Cl.
*G06F 9/44* (2006.01)
*G06F 9/455* (2006.01)

(52) U.S. Cl.
CPC ........ *G06F 9/4406* (2013.01); *G06F 9/45537* (2013.01); *G06F 9/441* (2013.01)

(58) Field of Classification Search
CPC ....... G06F 9/4406; G06F 9/441; G06F 9/4418
See application file for complete search history.

(56) References Cited

U.S. PATENT DOCUMENTS

| | | | | |
|---|---|---|---|---|
| 2001/0016879 A1* | 8/2001 | Sekiguchi | ............. | G06F 9/4843 719/319 |
| 2006/0282698 A1* | 12/2006 | Andreas | ............. | G06F 9/45537 714/4.1 |
| 2009/0322789 A1* | 12/2009 | Dubs | ............. | G09G 5/14 345/649 |
| 2011/0022832 A1* | 1/2011 | Motohama | ............. | G06F 9/441 713/2 |
| 2012/0131321 A1* | 5/2012 | Jitkoff | ............. | G06F 1/3203 713/2 |
| 2014/0372999 A1* | 12/2014 | Becker | ............. | G06F 8/665 717/169 |
| 2015/0002998 A1* | 1/2015 | Arima | ............. | G06F 1/1637 361/679.27 |

FOREIGN PATENT DOCUMENTS

| | | |
|---|---|---|
| JP | 2001-256066 | 9/2001 |
| JP | 2007-034572 | 2/2007 |
| JP | 2009145931 | 7/2009 |
| JP | 2011-008646 | 1/2011 |

* cited by examiner

*Primary Examiner* — Mohammed Rehman
*Assistant Examiner* — Alyaa T Mazyad
(74) *Attorney, Agent, or Firm* — Kunzler Law Group (57) ABSTRACT

The present invention provides a method of easily managing two or more OSs. A host OS, a guest OS, and a virtualization module are loaded into a primary physical address area of a main memory. The guest OS is executed in a virtual environment in a primary physical address area. A memory image of the guest OS loaded in the primary physical address area is copied to a secondary physical address area. The right of access to a processor is transferred to the guest OS copied in the secondary physical address area to execute the guest OS in a physical environment.

18 Claims, 9 Drawing Sheets

OPERATING SYSTEM MANAGEMENT OF SECOND OPERATING SYSTEM

FIELD

The present invention relates to a technique for executing and managing two or more operating systems that can run on the same hardware.

BACKGROUND

A virtual environment can be created in the same hardware environment on a laptop personal computer (laptop PC) or a desktop personal computer (desktop PC) to run two or more operating systems (OS). There are hypervisor type (type 1) and host OS type (type 2) of virtual environments. Among the OSs, there are mobile OSs developed for use on tablet terminals and smartphones, in addition to traditional OSs used on laptop PCs and desktop PCs. The laptop PC and the desktop PC are suitable for entering characters from a keyboard or a pointing device into a GUI or editing graphics, while the tablet terminal is particularly suitable for browsing Web sites though characters can be entered from a touch screen.

SUMMARY

When two or more OSs are executed in a virtual environment so that one OS inspects or restores a second OS, security and integrity can be improved. However, although the execution environment of the second OS can be switched between the physical environment and the virtual environment, the first OS and the second OS cannot be switched bidirectionally to run both OSs in the physical environment. Further, the type 1 virtual environment is typically created by loading a hypervisor and the first OS after loading the second OS, and when the inspection of the second OS is completed in the virtual environment, memory images of the first OS and the hypervisor are erased from a main memory and the second OS is returned to run in the physical environment. Therefore, it is necessary to load the first OS and the hypervisor each time the second OS to be executed is changed, spending excessive time in switching the OSs.

Further, even when the system can switch and execute two or more OSs, the frequency of use of each OS is not normally uniform, and there exist a primary OS mainly used and a secondary OS(s) secondarily used. If the primary OS can use as much physical address space as possible, it will be advantageous in improving performance. Situations may occur where there is a need to boot all OSs made to coexist on the main memory in respective logical blocks first, the actual memory space used by the primary OS is restricted, or any one of multiple secondary OSs cannot be selected and executed after the primary OS is executed, resulting in lack of operational flexibility. Therefore, a need exists for a method capable of booting, performing maintenance of, and shutting down a secondary OS, and executing the secondary OS with high performance while maintaining the operating environment of the primary OS.

Disclosed herein is a method of controlling the operation of a computer capable of executing a primary operating system or a secondary operating system. The primary operating system is loaded into a primary physical address area of a main memory. Next, the secondary operating system is loaded into the primary physical address area. The loaded secondary operating system is executed in a virtual environment in the primary physical address area. The virtual environment may be of type 1 or type 2. A memory image of the secondary operating system loaded in the primary physical address area is copied to a secondary physical address area of the main memory via a suspend state. The right of access to a processor is transferred to the secondary operating system copied in the secondary physical address area to execute the secondary operating system in a physical environment.

Since the memory image of the secondary operating system is copied to the secondary physical address area via the suspend state after the secondary operating system runs in the virtual environment, the secondary operating system can run in the physical environment in a state where the memory image of the primary operating system is secured in the main memory. A computer suitable for use with embodiments disclosed herein can include a keyboard and a touch screen as input devices.

To be more specific, in one embodiment, the computer may be a compatible type portable computer that can operate in a clamshell mode and a tablet mode, or a hybrid type portable computer that can detach a tablet unit including the touch screen from a base unit. Then, the primary operating system can create a primary operating environment that allows input from the keyboard or the pointing device, and the secondary operating system can create a secondary operating environment that allows input from the touch screen.

Before the memory image of the secondary operating system is copied, the primary operating system can perform maintenance of the secondary operating system in the virtual environment. The maintenance can include a virus check and restoration difficult for the secondary operating system to perform by itself. When the secondary operating system is loaded, the secondary operating system selected from two or more operating systems can be specified by an input device operated by a user.

In this case, when the user executing the primary operating system desires to use the secondary operating system, the user can operate the input device to copy the secondary operating system to the secondary physical address area after loading the secondary operating system into the primary physical address area in order to execute the secondary operating system in the physical environment. The primary operating system can secure the secondary physical address area logically partitioned in physical address space of the primary physical address area. In this case, if there is no need to execute the secondary operating system, relatively large blocks of physical address space can be used for the primary operating system without securing the secondary physical address area.

A virtualization module operating at an upper layer of the primary operating system can create a type 2 virtual environment. In this case, if the secondary operating system runs in the physical environment, performance can be remarkably improved. If the kind of secondary operating system to be executed is determined, the primary operating system, the secondary operating system, and the virtualization module may be loaded in a series of boot sequences.

When the secondary operating system is executed in the physical environment, the secondary operating system can perform Plug and Play operations to reconfigure hardware. In this case, even if the virtualization module cannot emulate the hardware sufficiently, the secondary operating system can make full use of the maximum functions of all the hardware connected in the physical environment.

The memory image can be copied by system firmware acquiring the right of access to a processor that is power-on reset at the time of resume from the suspend state. When the right of access to the processor is transferred to the primary operating system via the suspend state, the primary operating system can release an address area in which the secondary operating system of the primary physical address area is stored. Since there is no need to run the secondary operating system in the virtual environment after the memory image is copied to the secondary physical address area, it is desired to expand the physical address space of the primary operating system in this way.

If the right of access to the processor is switched between the primary operating system and the secondary operating system according to a switching event generated by the input device operated by the user, the user can change the operating environment with simple operations. Since the primary operating system and the secondary operating system are loaded into the primary physical address area as the same logical partition, both can be stored in the same boot partition of a disk drive. Therefore, there is no need to change the boot partition when the secondary operating system is booted following the primary operating system, and hence both can be booted in a series of boot sequences.

According to embodiments disclosed herein, there can be provided a method of easily managing two or more OSs capable of running on the same hardware. Further, according to embodiments disclosed herein, there can be provided a method of quickly switching between OS operating environments. Further, there can be provided a method of running the other OS in the physical environment after one OS performs maintenance of the other OS. Further, there can be provided a method of switching between the access right given to one OS capable of running in the physical environment and the access right given to the other OS capable of running in the physical environment. Further, there can be provided a method of switching between OS operating environments with different input devices used by the user. Furthermore, there can be provided a computer program and a computer for implementing such a method.

DETAILED DESCRIPTION

Figure 1:
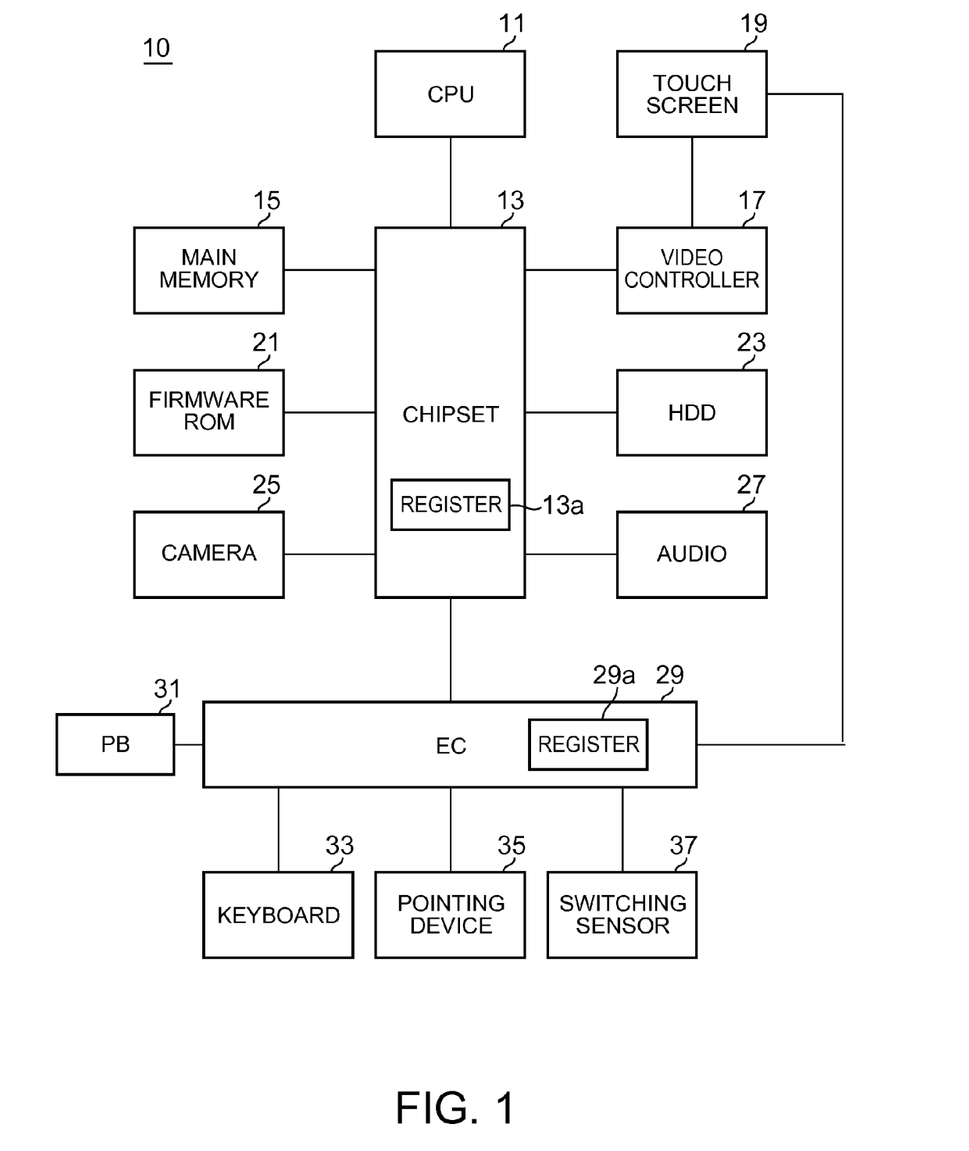
FIG. 1 is a functional block diagram describing the hardware configuration of a computer system.

FIG. 1 is a functional block diagram showing a configuration of a computer system 10. A CPU 11, a main memory 15, a video controller 17, a firmware ROM 21, an HDD 23, a camera 25, an audio device 27 such as a speaker and a microphone, and an embedded controller (EC) 29 are connected to a chipset 13. The CPU 11 is an X86 architecture microprocessor or a microprocessor compatible with the X86 architecture.

A touch screen 19 is made up of a flat-panel display, such as a liquid crystal or organic EL display, and a transparent touch panel laminated on the display. The display is connected to the video controller 17, and the touch panel is connected to the EC 29. An interface circuit including a memory controller, a SATA (Serial Advanced Technology Attachment), a HAD (High Definition Audio), a USB (Universal Serial Bus), a PCI (Peripheral Component Interconnect), and an LPC (Low Pin Count) is embedded in the chipset 13.

The firmware ROM 21 stores system firmware such as BIOS or UEFI instead thereof. The computer system 10 conforms to the ACPI (Advanced Configuration and Power Interface) standard, and the BIOS and OSs are adapted to ACPI. The chipset 13 includes an ACPI register 13a for controlling the power state of the computer system 10.

The BIOS includes code for switching between operating environments of the computer system in the embodiment as well as POST (Power On Self-Test) and authentication when the power supply of the computer is turned on. The HDD 23 is a boot drive for storing software to be described with reference to FIG. 4. The EC 29 is a microcomputer composed of a CPU, a ROM, a RAM, and the like to execute a program for the management of operating environments, such as temperature inside the computer system 10 and the power supply, independently of the CPU 11.

A power button 31, a keyboard 33, a pointing device 35, a switching sensor 37, and the touch panel of the touch screen 19 are connected to the EC 29. The pointing device 35 is an input device used to operate a mouse pointer displayed on the touch screen 19 and to perform input on an icon. The EC 29 also includes a controller for processing signals from the keyboard 33, the pointing device 35, and the touch panel that constitutes the touch screen 19. The operation of the switching sensor 37 will be described with reference to FIG. 2 and FIG. 3. The EC 29 includes a register 29a to be referred to in transition between power states.

In the ACPI standard, multiple power states are defined, and the computer system 10 can make a transition to any one of power-on state (S0 state), suspend state (S3 state) for supplying power only to a device necessary to write the contents of operations to the main memory 15 and hold the stored contents of the main memory 15, and a device necessary to restart the computer system 10, hibernation state (S4 state) for supplying power only to a device necessary to write the contents of operations to the HDD 23 or any other nonvolatile memory and to restart the computer system 10, and soft off or power-off state (S5 state) for supplying power only to the device necessary to restart the computer system 10.

In general, the system is resumed from the suspend state to the power-on state at a user's discretion or based on a schedule set by the system after a certain period of time has elapsed, while in this embodiment, a method called suspend and quick resume is adopted, where the system is resumed immediately after the system makes a transition to the suspend state. When an OS sets a flag in the register 29a through the BIOS to indicate transition to the suspend state, the EC 29 that refers to the register 29a in transition to the suspend state performs suspend and quick resume. The suspend and quick resume is intended to perform power-on reset of the CPU 11 in order to transfer the right of access to the CPU 11 once to the BIOS so that the BIOS will change the operating environment of the CPU 11.

The computer system 10 can be configured not only as a normal laptop PC used by opening and closing the display but also as a special type of laptop PC. FIG. 2 contains perspective views for describing an example of the computer system 10 configured as a compatible laptop PC 50. A display housing 53 that houses the touch screen 19 and a system housing 51 with the keyboard 33 and the pointing device 35 mounted thereon are coupled by a hinge mechanism 55.

Figure 2A:
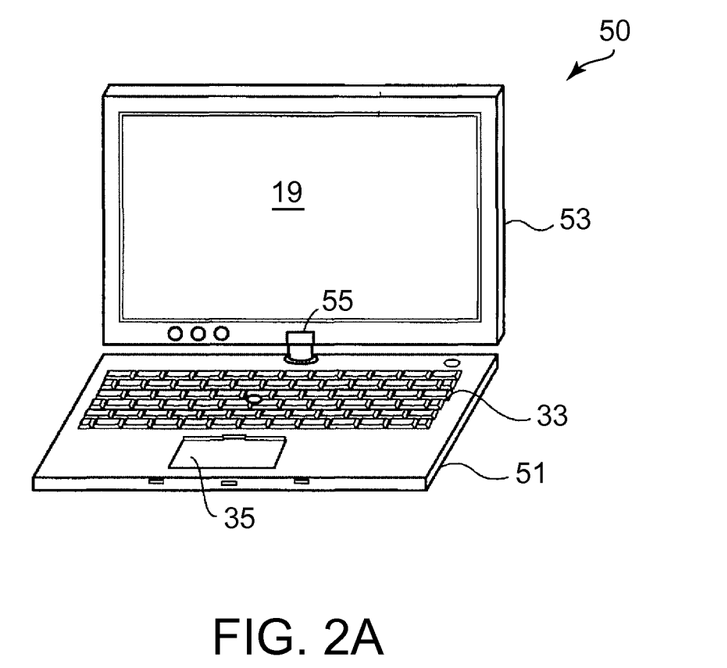
FIGS. 2A and 2B contains perspective views for describing an example of the computer system mounted in a compatible laptop PC.

In the state of FIG. 2A where the display housing 53 is open, the compatible laptop PC 50 can be operated using the keyboard 33 or the pointing device 35. The pointing device 35 is operated to move a pointer displayed on the touch screen 19, perform input by clicking at the position where the pointer is stopped, or the like. In this state, as an example, no touch operation on the touch screen 19 is performed.

Figure 2B:
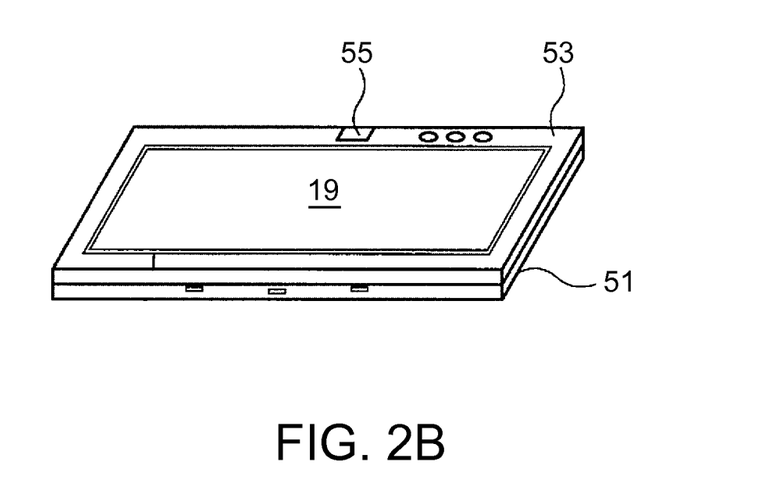

FIG. 2B shows a closed state where the display housing 53 in the state of FIG. 2A is rotated 180 degrees in the horizontal direction so that the back face will face the keyboard. In this case, the laptop PC 50 is in such a state that the touch screen 19 faces upward like a tablet terminal. In this state, the keyboard 33 and the pointing device 35 cannot be operated because they are hidden behind the display housing 53, and the user performs touch operations by touching the touch screen 19 with fingers. It is assumed that the form of use in FIG. 2A is called a clamshell mode, and the form of use in FIG. 2B is called a tablet mode. When detecting that the laptop PC 50 is switched to the clamshell mode or the tablet mode, the switching sensor 37 generates a switching event accordingly.

Figure 3A:
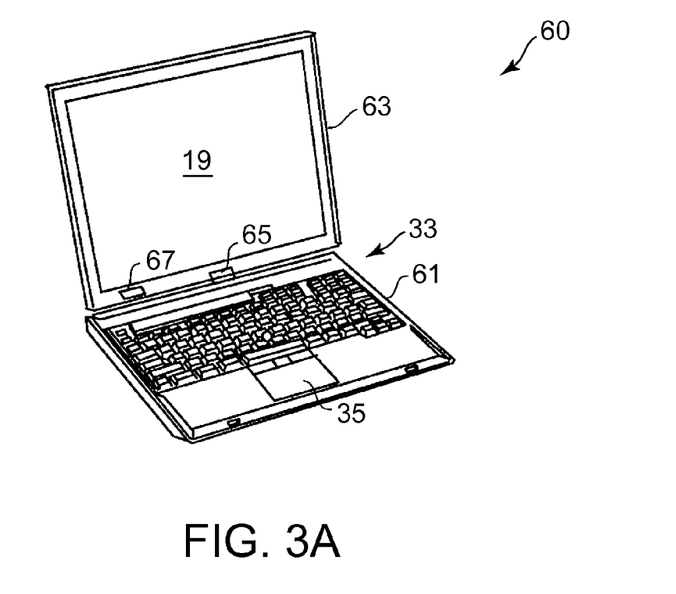
FIG. 3A-3C contains perspective views for describing another example of the computer system mounted in a hybrid laptop PC.
Figure 3B:
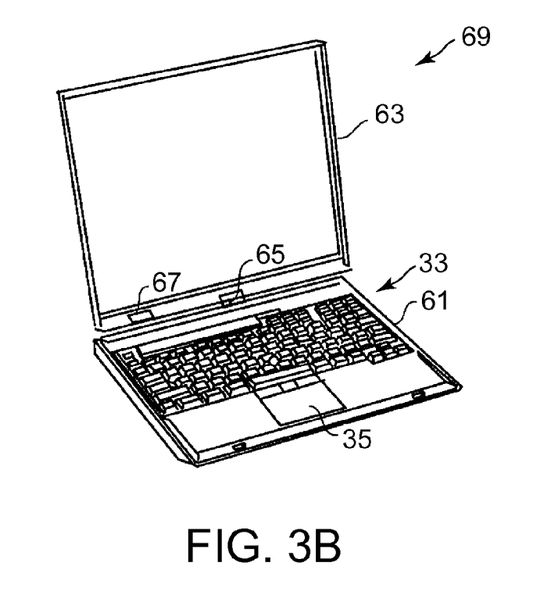
Figure 3C:
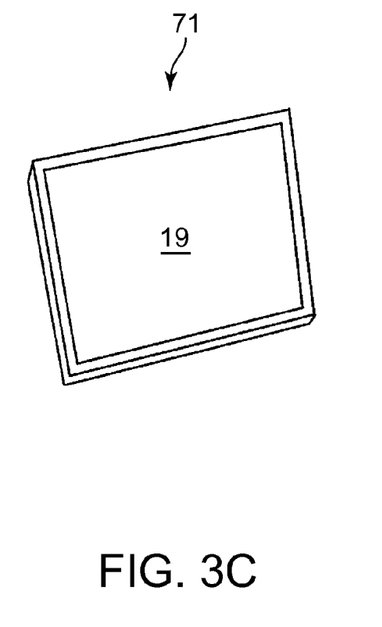

FIGS. 3a and 3b contains perspective views for describing another example of the computer system 10 configured as a hybrid laptop PC 60. The laptop PC 60 is made up of a tablet unit 71 and a base unit 69, which are shaped in the form of housings capable of being physically separated from and coupled to each other. FIG. 3A shows the laptop PC 60 when the tablet unit 71 and the base unit 69 are coupled, FIG. 3B shows the base unit 69 when the tablet unit 71 is separated therefrom, and FIG. 3C shows the tablet unit 71 in a separated state.

The tablet unit 71 is provided with the touch screen 19 on the housing surface, and almost all devices except the keyboard 33 and the pointing device 35 are housed inside the housing. The tablet unit 71 functions as a tablet terminal in the separated state. The base unit 69 is made up of a keyboard housing 61 and a support member 63 coupled to each other by a hinge mechanism 65. Since major system devices are not mounted in the base unit 69, the base unit 69 does not fulfill a function as a computer in the separated state. The tablet unit 71 can be mounted on and removed from the support member 63 with a user's operation of an eject switch 67.

The keyboard 33, the pointing device 35, and the like are provided in the keyboard housing 61. The laptop PC 60 is configured such that the tablet unit 71 functions as a laptop PC in a state of being mounted on the support member 63, and the hinge mechanism 65 can be rotated in the vertical direction so that the touch screen 19 will face the keyboard 33 to close the support member 63. Such an operational state that the laptop PC 60 is used by opening and closing the support member 63 holding the tablet unit 71 is called the clamshell mode.

Further, the laptop PC 60 is configured such that the support member 63 in the opened state can be rotated 180 degrees about the hinge mechanism 65 in the horizontal direction so that the back face of the support member 63 will face the keyboard 33 to close the laptop PC 60. Such an operational state that the laptop PC 60 is used in a state where the keyboard 33 and the pointing device 35 are hidden on the back of the touch screen 19 is called the tablet mode. Like the laptop PC 50, the keyboard 33 or the pointing device 35 is used to operate the laptop PC 60 in the clamshell mode, and the touch screen 19 is operated in the tablet mode or on the tablet unit 71.

The switching sensor 37 generates a corresponding switching event when detecting a change in the state of mounting or removing the tablet unit 71 on or from the support member 63. The switching sensor 37 also generates a corresponding switching event when detecting that the laptop PC 60 with the tablet unit 71 mounted therein is either in the tablet mode or the clamshell mode.

Figure 4A:
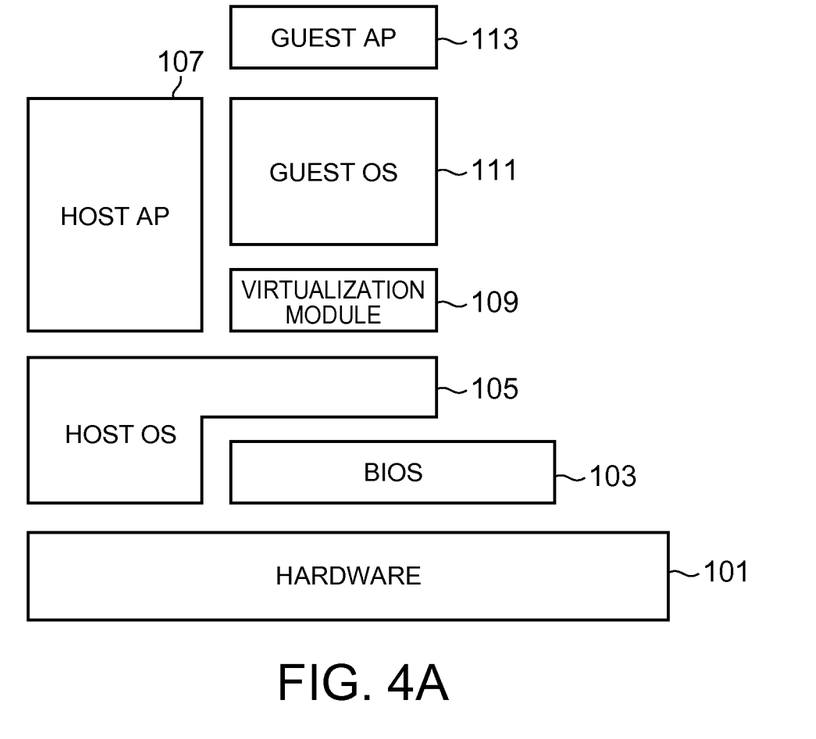
FIGS. 4A and 4B contains diagrams for describing a software configuration introduced in the computer system.
Figure 4B:
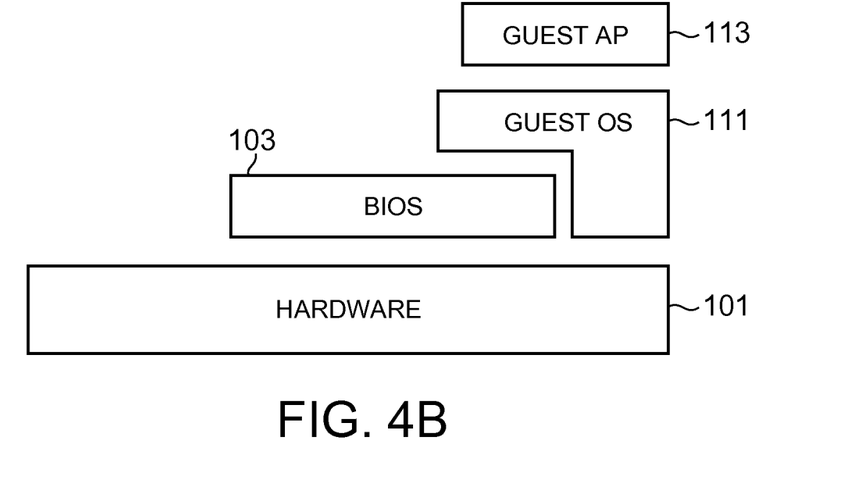

FIGS. 4a and 4b contains diagrams for describing the configuration of programs stored in the HDD 23. The programs stored in the HDD 23 include, in the same boot partition, a host OS 105, a host application (host AP) 107 that runs using the service of the host OS 105, a virtualization module 109, a guest OS 111, and a guest application (guest AP) 113 that runs using the service of the guest OS 111. The host OS 105 includes a module for updating the guest OS 111 and a module for performing a virus check on the guest OS 111.

FIG. 4A shows a state where the host OS 105 runs in the physical environment and the guest OS 111 runs in the virtual environment, and FIG. 4B shows a state where the guest OS 111 runs in the physical environment. Here, the physical environment means an operating environment in which the OS or a device driver thereof can access physical hardware directly. The virtual environment means an operating environment in which the OS accesses virtual hardware provided by the virtualization module emulating the physical hardware.

In this embodiment, the host OS 105 always runs in the physical environment, and the guest OS 111 runs in the virtual environment or the physical environment. Hardware 101 is made up of multiple physical devices that constitute the computer system 10 shown in FIG. 1. The virtualization module 109 operates at a layer on the host OS 105 to emulate the hardware 101 in order to create a type 2 virtual environment for providing virtual hardware to the guest OS 111. The virtualization module 109 can create virtual environments for two or more guest OSs at the same time. There is no need to modify the host OS 105 and the guest OS 111 under certain embodiments. Therefore, although the host OS cannot be distinguished from the guest OS when the OSs run in the physical environment, the guest OS is called the guest OS even in the physical environment because it remains unchanged in its entity.

The host OS 105, in one embodiment, may be Windows (registered trademark), Linux (registered trademark), or any suitable OS planned to be used in the clamshell mode. In one example, the user can perform input only through the keyboard 33 or the pointing device 35 in the operating environment of the host OS 105. The guest OS 111 can be any one or more of Android (registered trademark), Windows (registered trademark) RT, and the like, planned to be used in the tablet mode or on the tablet unit 71. In one example, the user can perform input only through the touch screen 19 in the operating environment of the guest OS 111.

Figure 5A:
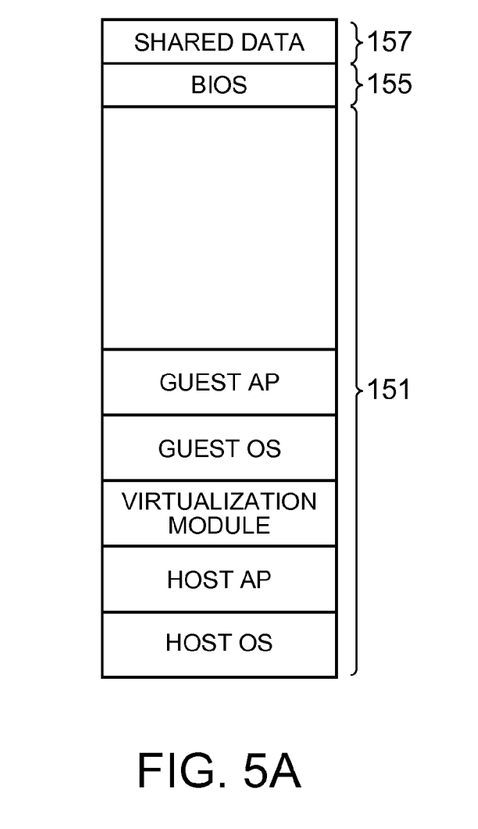
FIG. 5A-5C contains memory maps when the computer system switches between operating environments.
Figure 5B:
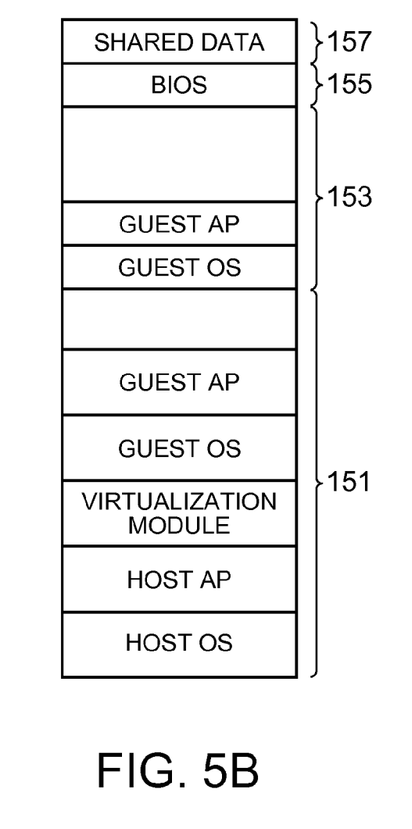
Figure 5C:
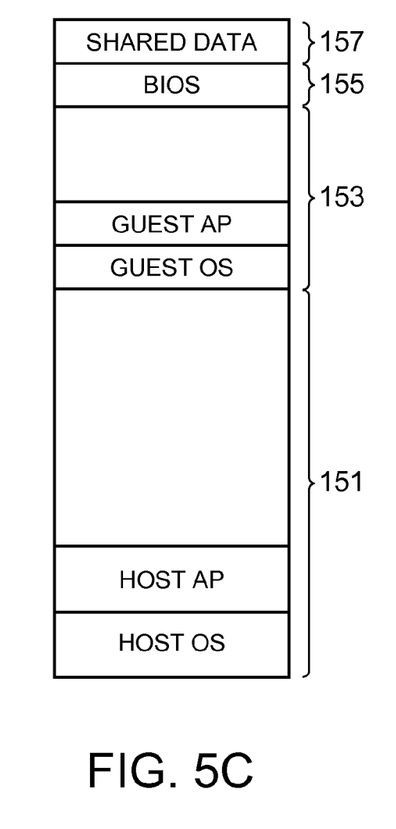

FIG. 5a-5c contains diagrams for describing memory maps of the main memory 15 when the operating environment is changed. Physical address space including physical address areas 151, 153, 155, and 157 logically partitioned is set in the main memory 15. The logical partitions are defined as areas to which the OSs or the BIOS can perform access. The physical address areas 151, 153, 155, and 157 are assigned by the BIOS at boot time so that the OS will control a program running in each assigned area not to access another area.

The physical address area 151 is used by the host OS 105 and a program controlled by the host OS 105, and the physical address area 153 is used by the guest OS 111 and a program controlled by the guest OS 111. The physical address area 155 is used by the BIOS. Shared data necessary for the host OS 105 to control the guest OS 111 is written to the physical address area 157 in such a manner that the host OS 105, the guest OS 111, and the BIOS can access the shared data.

FIG. 5A shows a state where the host OS 105, the host AP 107, the virtualization module 109, the guest OS 111, the guest AP 113 are loaded into the physical address area 151. A program running under the environment of the host OS 105 in this state runs using a virtual address area mapped to the physical address area 151. The physical address area 153 is not formed, and the physical address area 151 occupies relatively large amounts of physical address space.

FIG. 5B shows a state where the physical address area 153 is assigned to a part of the physical address space occupied by the physical address area 151. As shown in FIG. 5B, memory images of the guest OS 111 and the guest AP 113 loaded in the physical address area 151 are copied to the physical address area 153. When suspend and quick resume is performed in this state, the BIOS can switch the right of access to the CPU 11 to either the host OS 105 or the guest OS 111 according to a procedure to be described with reference to FIG. 7.

When the host OS 105 obtains the access right, the program running under the control of the host OS 105 as shown in FIG. 4A runs using a virtual address area mapped to the physical address area 151. When the guest OS 111 obtains the access right, the program running under the control of the guest OS 111 as shown in FIG. 4B runs using a virtual address area mapped to the physical address area 153. The host OS 105 and the guest OS 111 can determine the size of the virtual address area, respectively, where a virtual address area larger than the physical address area can be used by using a paging function.

In the state of FIG. 5B, the physical address area 151 is reduced to create the physical address area 153. As the physical address area becomes smaller, the frequency of swapping to a virtual memory provided in the HDD 23 increases to degrade the performance of the host OS 105 and the program running under the control of the host OS 105. FIG. 5C shows a state where the address area with the guest OS 111 and the guest AP 113 of the physical address area 151 in FIG. 5B are stored is released for any other program. In the state of FIG. 5C, the physical address space available to the host OS 105 is more expanded than the state of FIG. 5B.

Figure 6:
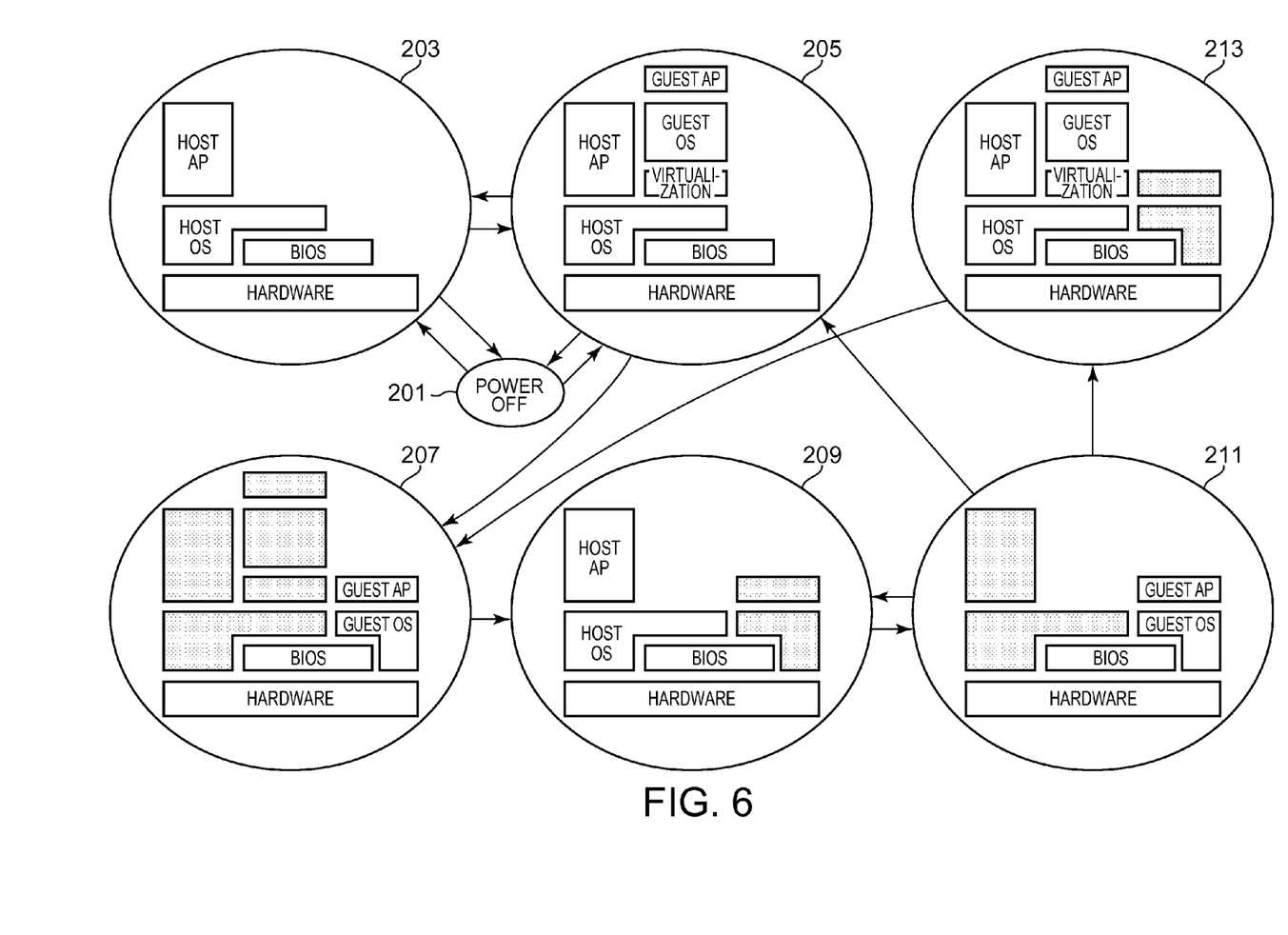
FIG. 6 is a state transition diagram when a host OS manages a guest OS.

FIG. 6 is a diagram showing state transitions of the computer system 10. State 201 is the power-off state. State 203 is a state where the host OS 105 and the host AP 107 are loaded into the physical address area 151 so that the host OS 105 will run in the physical environment. When the host OS 105 does not create a virtual environment, the system operates in this state. The system is shut down from state 203 by a usual method to enable transition to state 201.

State 205 is a state where the virtualization module 109, the guest OS 111, and the guest AP 113 are loaded into the physical address area 151 in state 203 as shown in FIG. 5A so that the guest OS 111 and guest AP 113 will run in the type 2 virtual environment created by the host OS 105. Since the host OS 105 and the guest OS 111 are stored in the same boot partition of the HDD 23, they can also be loaded together with the virtualization module 109 at one boot time to make a transition from state 201 to state 205. The system is shut down from state 205 by the usual method to enable transition from state 205 to state 201.

State 207 is a state where the memory images of the guest OS 111 and the guest AP 113 loaded in the physical address area 151 are copied to the physical address area 153 formed by the host OS 105 as shown in FIG. 5B. In state 207, the memory images of state 205 remain in the physical address area 151. Further, state 207 is a state where the guest OS 111 copied in the physical address area 153 runs in the physical environment, and the host OS 105 loaded in the physical address area 151 makes a transition to a sleep state.

Here, the sleep state of a program means a state of an OS the memory image of which remains in the main memory 15 when the power of the computer system 10 is in the power-on state, but from which the right of access to the CPU 11 is deprived. State 209 is a state where the memory images of the guest OS 111 and the guest AP 113 are copied to the physical address area 153 as shown in FIG. 5C so that the address areas of the guest OS 111 and the guest AP 113 loaded in the physical address area 151 are released for other programs. Further, state 209 is a state where the host OS 105 loaded in the physical address area 151 runs in the physical environment and the guest OS 111 the memory image of which is copied in the physical address area 153 makes a transition to the sleep state.

State 211 is the same as state 209 in terms of the structure of memory images, but it is a state where the host OS 105 loaded in the physical address area 151 makes a transition to the sleep state and the guest OS 111 the memory image of which is copied in the physical address area 153 is running in the physical environment. State 213 is a state where the guest OS 111 and the guest AP 113 that have run in the physical environment are copied to the physical address area 151 so that the guest OS 111 will run in the virtual environment created by the virtualization module 109. The computer system 10 cannot be shut down directly from states 207 to 213, and the procedure will be described with reference to FIG. 9.

Figure 7:
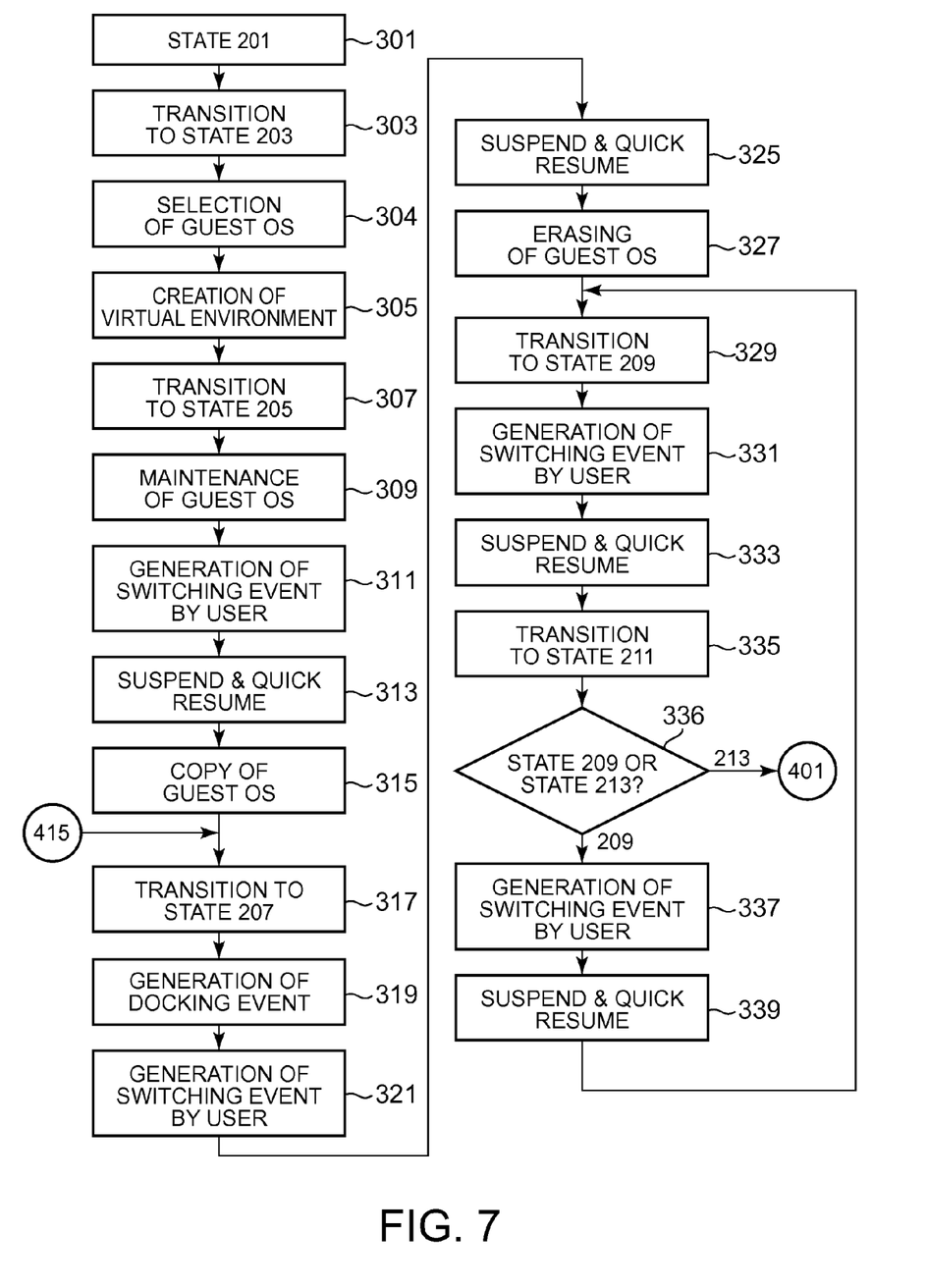
FIG. 7 is a flowchart showing an operation procedure when the host OS manages the guest OS.
Figure 8:
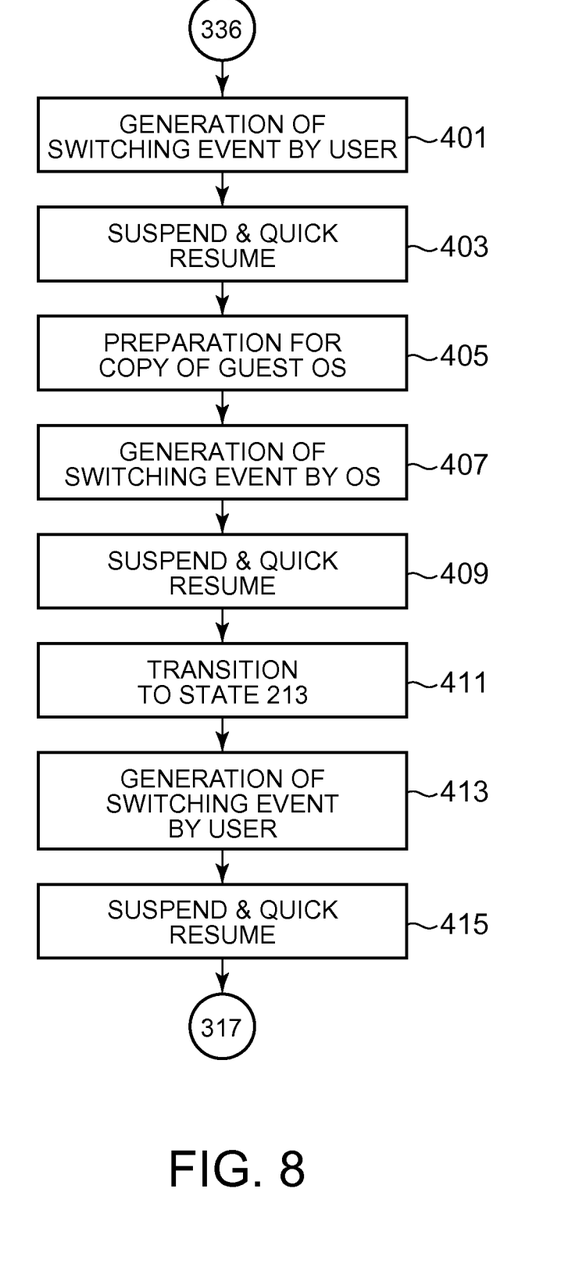
FIG. 8 is a flowchart showing the operation procedure when the host OS manages the guest OS.

FIG. 7 and FIG. 8 are flowcharts showing a procedure for the host OS 105 to manage the guest OS 111. In block 301 where the computer system 10 is in state 201, when the power button 31 is pressed in block 303, the power supply of the computer system 10 is turned on. When the computer system 10 is the laptop PC 50 or 60, it is assumed that the computer system 10 is started in the clamshell mode. When the power is stabilized, the CPU 11 initializes the internal cache and register to set a reset vector. Then, the CPU 11 loads the BIOS into the physical address area 155 in the main memory. The CPU 11 that is power-on reset in one embodiment starts execution from the first address of the BIOS.

The CPU 11 initializes at least the physical address area 157 in the main memory 15. The physical address area 157 is defined to declare a default execution path when being initialized. The BIOS first refers to the physical address area 157 to recognize a start factor. When determining that the default execution path is set, the BIOS executes a so-called cold boot to perform a complete POST (Power On Self Test) for detecting, initializing, and setting all peripheral devices. In the case of a so-called warm boot for resuming from the suspend state to achieve suspend and quick resume, an abbreviated POST is performed to shorten the resume time. Note that the CPU 11 omits the initialization of the main memory at warm boot.

When the BIOS completes the POST, the CPU 11 refers to a MBR (Master Boot Record) of the HDD 23 to select a boot partition in order to transfer control to a boot loader. The boot loader starts loading the host OS 105 stored in the boot partition. Programs stored in the same boot partition as the host OS 105 are so set in a boot file that the programs can be loaded into the main memory 15 in order in a bootstrap procedure. The BIOS assigns a relatively large amount of physical address space by default to the host OS 105 as shown in FIG. 5A.

As an example, when the loading of the host OS 105 and the host AP 107 is completed, the system makes a transition to state 203 so that the host OS 105 and the host AP 107 will run in the physical environment. In this state, the host OS 105 can use the relatively large amount of physical address area 151 shown in FIG. 5A. The virtualization module 109, the guest OS 111, and the guest AP 113 stored in the same boot partition may be loaded following the host OS 105. However, when the user does not plan to use the guest OS 111, it is desired to load only the host OS 105 and the host AP 107 in order not to restrict the physical address space. At this point, the host OS 105 in one embodiment displays, on the touch screen 19, two or more icons respectively corresponding to two or more guest OSs stored in the HDD 23 to enable the user to select any guest OS.

In block 304, when the user performs an operation to select the guest OS 111 from among the two or more icons through the pointing device 35, the host OS 105 sets the physical address area 153 in the physical address area 151 to run the guest OS 111 in the physical environment as shown in FIG. 5B. Since the physical address area 153 is logically partitioned from the physical address area 151, the physical address space available to the host OS 105 is narrowed by the area after that.

Then, in block 305, the host OS 105 loads the virtualization module 109 from the HDD 23 into the physical address area 151 to create the type 2 virtual environment. Then, in block 307, the host OS 105 loads the guest OS 111 and the guest AP 113 from the HDD 23 into the physical address area 151, and makes a transition to state 205 so that the guest OS 111 and the guest AP 113 can run in the virtual environment. In this embodiment, however, there is no need to execute the guest AP 113 in the low-performance virtual environment as will be described later.

In block 309, the user performs maintenance of the guest OS 111 through the host OS 105, such as a virus check, update, or restoration. When the guest OS 111 infected with malware performs a virus check on itself, the virus check cannot be performed reliably because the virus check is likely to be interfered with by malware. Further, when a primary module of the guest OS 111 is damaged, the guest OS 111 cannot restore itself.

In the type 2 virtual environment, the guest OS 111 runs equivalently to the host AP in a relationship with the host OS 105. In this embodiment, the type 2 virtual environment can be so used that the host OS 105 will perform a virus check on the guest OS 111 or restore the guest OS 111 to ensure security and reliability. In state 205, the virtualization module 109 emulates the hardware 101 abstracted by the host OS 105 to provide virtual hardware to the guest OS 111.

The host OS 105 working on the hardware 101 in the physical environment can completely use the functions of the hardware 101, but the virtualization module 109 may not be able to emulate the hardware 101 in a manner to make full use of the functions for the guest OS 111. For example, the virtualization module 109 may not be able to emulate the audio device 27, or may emulate the touch screen 19 at resolution lower than the maximum resolution available on the touch screen 19. Further, when the guest OS 111 is executed in the virtual environment, an overhead occurs by going through the host OS 105.

For these reasons, in certain embodiments, only the maintenance of the guest OS 111 is performed in state 205 without execution of the guest AP 113 for substantial processing. In block 311, it is assumed that the user desires to execute a guest AP 113 suitable for input from the touch screen 19 on the assumption of being able to be returned to the execution environment of the host OS 105 in a short time. As an example of one embodiment, the compatible laptop PC 50 of FIG. 2 may used in the tablet mode, or the hybrid laptop PC 60 of FIG. 3 may used in the tablet mode or the tablet unit 71 may be used independently. At this time, the switching sensor 37 detects an operation to change the operation mode, and inputs a switching event to the EC 29 to make a transition to state 207.

The user may desire to execute the guest AP 113 suitable for input from the touch screen 19 even in the clamshell mode. At this time, the user inputs a switching event to the EC 29 through the keyboard 33 or the pointing device 35 to make a transition to state 207. The EC 29 notifies the host OS 105 of a switching even received by interrupting the CPU 11. In block 313, the host OS 105 that received the switching event performs suspend and quick resume.

The host OS 105 requests the host AP 107, the virtualization module 109, and the guest OS 111 to suspend execution. The guest OS 111 that received the request instructs the guest AP 113 to suspend execution. The host OS 105 stores, in the physical address area 157, the system context held by the CPU 11, to which supply of power is suspended in the suspend state, and a register and a volatile memory as peripheral devices. The guest OS 111 stores, in the physical address area 157, the system context of virtual hardware obtained by emulating the same peripheral devices.

When the preparation for suspend is completed, the host OS 105 writes, to the physical address area 157, information indicative of an execution path of the BIOS at resume time, and writes, to the physical address area 157, addresses at which the memory images of the guest OS 111 and the guest AP 113 as copy sources stored in the physical address area 151 are stored. The execution path of the BIOS written in the physical address area 151 indicates that, after the BIOS copies the memory images as copy sources to the physical address area 153, the right of access to the CPU 11 is transferred to the guest OS 111 copied in the physical address area 153.

Then, the host OS 105 sets the suspend state in the ACPI register 13a of the chipset 13 as a transition destination, and sets a suspend and quick resume flag in the register 29a of the EC 29. The chipset 13 with the suspend state set in the ACPI register 13a instructs the EC 29 to make the transition of the system to the suspend state. The EC 29 refers to the register 29a in transition to the suspend state.

When recognizing that suspend and quick resume is set in the register 29a, the EC 29 resumes the power supply to the power-on state immediately after transition to the suspend state for a moment. The CPU 11 that is power-on reset executes the BIOS from the first address. The BIOS refers to the physical address area 157, determines the execution path, further acquires the addresses of the copy sources, and copies the memory images of the guest OS 111 and the guest AP 113, loaded into the physical address area 151 as shown in FIG. 5B, to the physical address area 153 in block 315. Further, the BIOS restores the system context of the virtual hardware written in the physical address area 157 to the hardware 101 to which the supply of power is resumed.

When the BIOS transfers the access right to the guest OS 111, the system makes a transition to state 207 in block 317 so that the guest OS 111 and the guest AP 113 will start running in the physical environment. The host OS 105 from which the access right is deprived makes a transition to the sleep state. At this point, the guest OS 111 may restore the system context set in the virtual hardware to the hardware 101 on behalf of the BIOS. When the hardware 101 is not emulated completely in state 205, even if the guest OS 111 restores the system context in the virtual environment, the functions of the hardware 101 cannot be completely used in the physical environment.

In block 319, the guest OS 111 generates a docking event for reconfiguring the hardware 101. The guest OS 111 that generated the docking event performs enumeration using an ACPI plug-and-play function to detect connected devices in order to carry out reconfiguration. The guest OS 111 installs a device driver or sets a controller for a device newly detected in the physical environment, or reconfigures a device that was detected in the virtual environment but was not able to be configured completely. In regard to peripheral devices completely emulated, the guest OS 111 restores the system context of the virtual hardware. As a result, the guest OS 111 can run in the physical environment by making full use of the maximum functions of all the hardware 101.

The user using the guest OS 111 that runs in the physical environment may desire to execute the host OS 105 in order to enter a large number of characters or execute the host AP 107 that can run only on the host OS 105. In block 321, the user can generate a switching event to execute the host OS 105 through the touch screen 19. At this time, in the laptop PC 50 or 60, the switching sensor 37 that detected a switching operation to the clamshell mode can generate the switching event. In block 325, the guest OS 111 performs suspend and quick resume in the same procedure as in block 313.

Before suspend, the guest OS 111 writes information indicative of an execution path along which the BIOS transfers the right of access to the CPU 11 to the host OS 105 upon resume. The host OS 105 that obtained the access right in block 327 runs in the physical environment, and the guest OS 111 makes a transition to the sleep state. At this time, since the memory images of the guest OS 111 and the guest AP 113 remain in the physical address area 151, the guest OS 111 also starts running in the virtual environment.

However, the operation of the guest OS 111 that runs in the physical environment and the operation of the guest OS 111 that runs in the virtual environment may be inconsistent. Further, as mentioned above, there is no need to run the guest OS 111 in the virtual environment for actual processing. Therefore, the host OS 105 may suspend the operation of the guest OS 111 and the guest AP 113 to release the addresses of the physical address area 151 at which the guest OS 111 and the guest AP 113 are loaded so that other programs can use the addresses. As a result, the physical address space available to the host OS 105 is expanded as shown in FIG. 5C, and the system makes a transition to state 209.

In block 331, when desiring to execute the guest OS 111 in the physical environment again, the user generates the same switching event as in block 311, and suspend and quick resume is performed in block 333 in the same manner as in block 313. At this time, the host OS 105 writes, to the physical address area 157 before suspend, information indicative of an execution path along which the BIOS gives the right of access to the CPU 11 to the guest OS 111 upon resume. In block 335, the system makes a transition to state 211. In block 336, the user can select either state 209 or state 211 to perform the transition of the system. When state 209 is selected, the user generates the same switching event in block 337 as in block 321 to perform suspend and quick resume in block 339 in the same manner as in block 325. As a result, the right of access to the CPU 11 is transferred to the host OS 105 in block 329, and the system makes a transition to state 209.

After that, a switching event can be generated in blocks 331 and 337 to switch the operating environment between state 209 to execute the host OS 105 in the physical environment and state 211 to execute the guest OS 111 in the physical environment. When the user selects state 213 in block 336, the procedure moves to block 401 in FIG. 8. In block 401, the user generates a switching event through the touch screen 19 to make a transition to state 213. In block 403, the guest OS 111 performs suspend and quick resume in the same manner as in block 325 once to make a transition to state 209. At this time, the guest OS 111 writes, to the physical address area 157 before suspend, information indicative of an execution path along which the BIOS performs processing for making a transition to state 209 upon resume, information indicative of processing for copying memory images of the physical address area 153, and addresses at which the memory images are stored.

The host OS 105 that obtained the access right in block 405 refers to the physical address area 157 to determine the execution path in order to prepare for copying data stored in the physical address area 153 to the physical address area 151. In the physical address area 153, the guest OS 111 and the guest AP 113 that run in the physical environment, and the memory images made up of data created thereby are stored. The host OS 105 loads the virtualization module 109 as necessary, secures, in the physical address area 151, physical address space for copying the memory images stored in the physical address area 153, and writes the addresses to the physical address area 157.

Then, the host OS 105 generates a switching event for giving the access right to the BIOS in block 407. At this time, the host OS 105 writes, to the physical address area 157 before suspend, information indicative of an execution path along which the BIOS performs processing for making a transition to state 213. The host OS 105 performs suspend and quick resume in block 409. When the BIOS that obtained the access right in block 411 refers to the physical address area 157 and copies the memory images stored in the physical address area 153 to the physical address area 151, the system makes a transition to state 213 in which the host OS 105 acquires control and the guest OS 111 runs in the virtual environment.

In this state, the host OS 105 can perform the maintenance or restoration of the guest OS 111 again. Here, when running the guest OS 111 in the physical environment, the system makes a transition from state 213 to state 207. When the user generates a switching event in block 413 through the keyboard 33 or the pointing device 35, the host OS 105 performs suspend and quick resume in block 415 to make a transition to state 207 in block 317 of FIG. 7.

Figure 9:
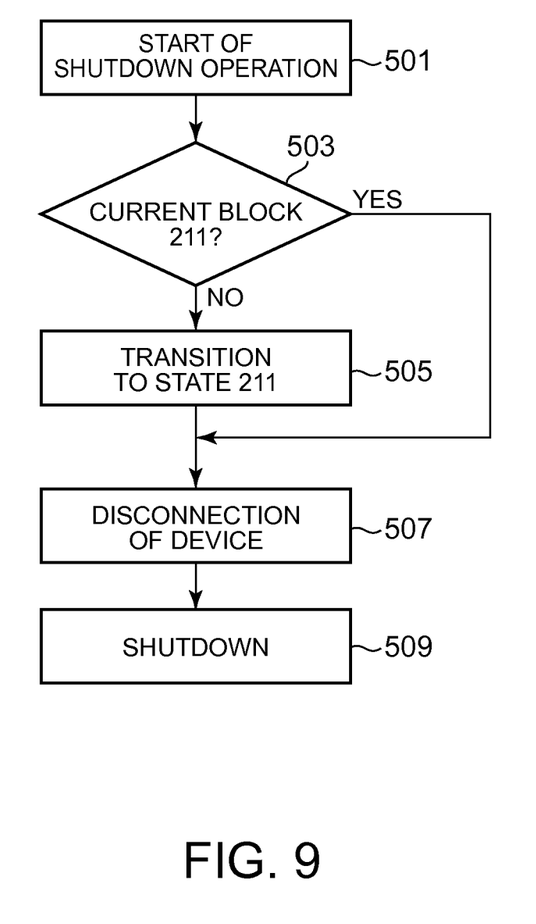
FIG. 9 is a flowchart showing an operation procedure when the host OS shuts down the computer system.

When an operating environment is used by switching between the host OS 105 and the guest OS 111, the computer system 10 makes a transition to any one of states 209, 211, and 213. FIG. 9 is a flowchart showing a procedure when the system is shut down from any one of states 209, 211, and 213. In block 501, the user performs an operation for starting shutdown of the host OS 105 or the guest OS 111. In block 503, when the current operational state is state 211 where the guest OS 111 operates in the physical environment, the procedure moves to block 507, while when the current operational state is state 209 or 213 where the host OS 105 runs in the physical environment, procedure moves to block 505.

In block 505, the host OS 105 generates a switching event and performs suspend and quick resume without the intervention of the user, making a transition to state 211. The transition from state 213 to state 211 is made via state 207 or 209. When the transition is made from state 209 to state 211 via block 505, or when the guest OS 111 generates an undocking event in response to the fact that the shutdown operation is performed in block 501 at the time of state 211 and notifies the device driver of that effect, the device driver disconnects the hardware 101 in block 507.

When all peripheral devices are disconnected, the guest OS 111 invalidates the physical address area 153. After that, the system performs suspend and quick resume to give the access right to the host OS 105, and makes a transition to state 205. In block 509, the host OS 105 stops programs running in the physical address area 151, and further disconnects the hardware 101 to stop the power supply through the chipset 13.

Two or more guest OSs that run in a virtual environment of the virtualization module 109 can be loaded into the physical address area 151. At this time, the host OS 105 can form two or more logical blocks in the physical address area 151 and copy respectively different guest OSs from the physical address area 151. Then, the host OS 105 performs suspend and quick resume to enable switching between each guest OS that runs in the physical environment and the host OS 105 that runs in the physical environment, and switching between guest OSs that run in the physical environment.

While embodiments have been described by taking the type 2 virtual environment as an example, in other examples, a system in which a hypervisor running on hardware creates a type 1 virtual environment. In this case, from among two or more guest OSs once loaded in the same physical address area, the memory image of a guest OS to run in the physical environment can be selected and copied to another physical address area.

While the present embodiments have been described with reference to the specific embodiment shown in the accompanying drawings, the present embodiments are not limited to what is shown in the drawings. It is needless to say that any known configuration can be employed as long as the configuration has the effects of the present invention.

What is claimed is:

1. A method comprising:
loading a primary operating system into a primary physical address area of a main memory in a tablet mode;
loading a secondary operating system into the primary physical address area;
concurrently running the loaded secondary operating system in a virtual environment in the primary physical address area and running the loaded primary operating system in a physical environment in the primary physical address area, wherein the primary operating system has a right of access to a processor; and
acquiring the right of access of the secondary operating system to the processor and running the secondary operating system in a physical environment, wherein acquiring the right of access of the secondary operating system comprises copying a memory image of the secondary operating system loaded in the primary physical address area to a secondary physical address area of the main memory via a suspend state, and wherein acquiring the right of access of the secondary operating system occurs in response to a switch from the tablet mode to a clamshell mode, and wherein:
copying the memory image of the secondary operating system includes:
causing the computer to make a transition to the suspend state; and
executing a system firmware in response to the computer resuming from the suspend state, wherein the system firmware reads data from a shared memory area and performs a copying function based on the data read from the shared memory area.

2. The method of claim 1, wherein running the loaded secondary operating system in the virtual environment includes the primary operating system causing the computer to initiate a maintenance function to be performed on the secondary operating system.

3. The method of claim 1, wherein loading the secondary operating system includes receiving input from a user selecting the secondary operating system from among two or more operating systems.

4. The method of claim 1, further comprising allocating, by the primary operating system, the secondary physical address area logically partitioned in physical address space of the primary physical address area.

5. The method of claim 1, wherein running in the virtual environment includes a virtualization module that operates at an upper layer of the primary operating system creating a type 2 virtual environment.

6. The method of claim 5, further comprising loading the primary operating system, the secondary operating system, and the virtualization module in a series of boot sequences.

7. The method of claim 6, wherein running the secondary operating system in the physical environment includes the secondary operating system performing a Plug and Play operation to reconfigure hardware.

8. The method of claim 1, further comprising:
transferring the right of access to the processor to the primary operating system via the suspend state; and
releasing, by the primary operating system, an address area in which the secondary operating system of the primary physical address area is stored.

9. The method of claim 8, further comprising switching the right of access to the processor between the primary operating system and the secondary operating system according to a switching event generated by input from a user.

10. A computer, comprising:
a touch screen;
a disk drive for storing a primary operating system, a secondary operating system, and a virtualization module capable of providing a virtual environment to the secondary operating system; a main memory into which the primary operating system, the secondary operating system, and the virtualization module are loaded in a tablet mode, and in which a primary physical address area that enables the secondary operating system to run in a virtual environment and a secondary physical address area logically partitioned from the primary physical address area are defined; and
a nonvolatile memory for storing system firmware that causes the computer to copy, to the secondary physical address area, a memory image of the secondary operating system loaded in the primary physical address area,
    wherein the secondary operating system runs in a physical environment in the secondary physical address area, and wherein the firmware causes the computer to copy the memory image of the secondary operating system loaded in the primary physical address area to the secondary physical address area in response to a switch from the tablet mode to a clamshell mode, and wherein:
    the system firmware causing the computer to copy the memory image of the second operating system includes:
        causing the computer to make a transition to the suspend state; and
        executing the system firmware in response to the computer resuming from the suspend state, wherein the system firmware reads data from a shared memory area and performs a copying function based on the data read from the shared memory area.

11. The computer according to claim 10, wherein the secondary operating system performs a Plug and Play operation to cause the computer to reconfigure, in the physical environment, hardware configured in the virtual environment.

12. The computer according to claim 10, wherein the primary operating system causes the computer to allow input from a keyboard, and the secondary operating system causes the computer to function to allow input from the touch screen.

13. The computer according to any one of claim 10, wherein the computer comprises a portable computer capable of operating in the clamshell mode and the tablet mode.

14. The computer according to any claim 10, wherein the computer is a hybrid portable computer capable of detaching a tablet unit including the touch screen from a base unit.

15. A program product comprising a computer readable storage medium that stores code executable by a processor to perform:
    running a primary operating system in a physical environment in a primary physical address area of a main memory and running a secondary operating system in a virtual environment in a tablet mode;
    copying, to a secondary physical address area, a memory image of the secondary operating system loaded in the primary physical address area in response to a switch from the tablet mode to a clamshell mode; and
    running the secondary operating system in the physical environment in the secondary physical address area, and wherein:
    copying the memory image of the secondary operating system includes:
        causing the computer to make a transition to a suspend state; and
        executing a system firmware in response to the computer resuming from the suspend state, wherein the system firmware reads data from a shared memory area and performs a copying function based on the data read from the shared memory area.

16. The program product of claim 15, further comprising code executable by a processor to cause the primary operating system to perform maintenance of the secondary operating system with the second operating system running in the virtual environment.

17. The program product of claim 15 further comprising code executable by a processor to implement a function for releasing an address area of the secondary operating system loaded in the primary physical address area to the primary operating system; and a function for switching between a state where the primary operating system runs in the physical environment and a state where the secondary operating system runs in the physical environment.

18. The program product of claim 15 further comprising code executable by a processor to cause the secondary operating system to reconfigure, in the physical environment, virtual hardware configured in the virtual environment.

* * * * *